May 4, 1965
M. T. SIMNAD
3,182,102
METHOD AND APPARATUS FOR MAKING DENSE BODIES
OF REFRACTORY MATERIALS
Filed Feb. 13, 1963
2 Sheets-Sheet 1
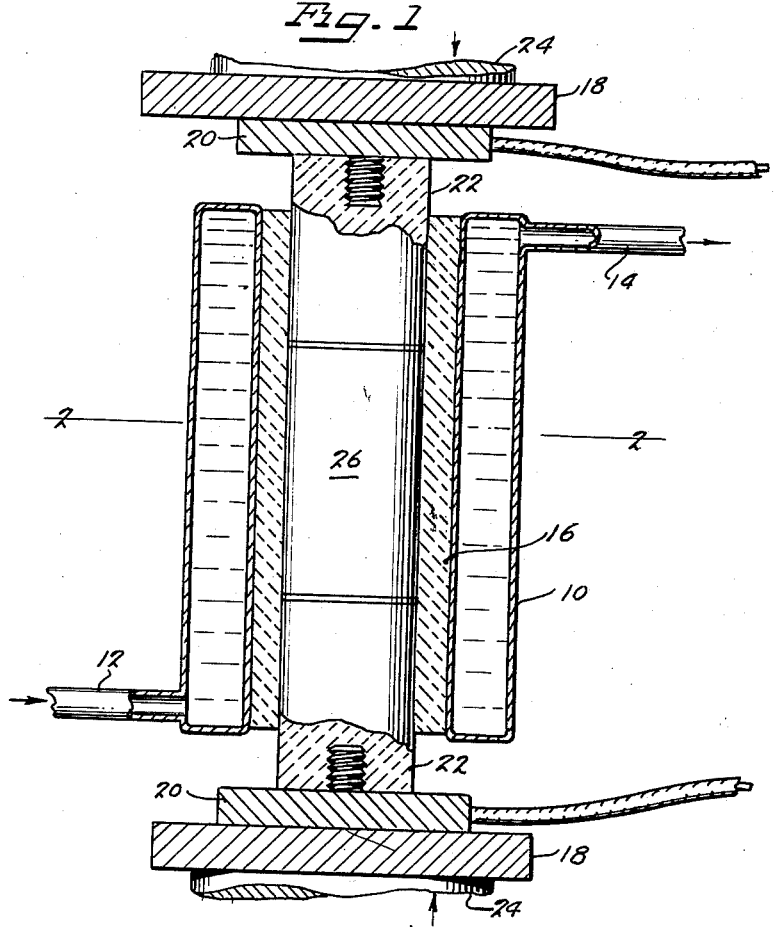
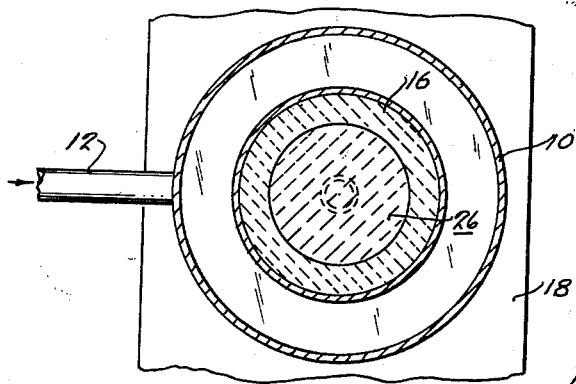
Inventor
MASSOUD T SIMNAD
By Soans, Anderson, Luedeka & Fitch
Attys May 4, 1965

M. T. SIMNAD 3,182,102

METHOD AND APPARATUS FOR MAKING DENSE BODIES
OF REFRACTORY MATERIALS

Filed Feb. 13, 1963

Inventor
MASSOUD T SIMNAD

By Soans, Anderson, Svedeka & Ditch
Attys

United States Patent Office 3,182,102
Patented May 4, 1965

3,182,102
METHOD AND APPARATUS FOR MAKING DENSE BODIES OF REFRACTORY MATERIALS
Massoud T. Simnad, Wellesley, Mass., assignor, by mesne assignments, to the United States of America as represented by the United States Atomic Energy Commission
Filed Feb. 13, 1963, Ser. No. 258,309
3 Claims. (Cl. 264—21)

This application is a continuation-in-part of application Serial No. 11,529, filed February 29, 1960, and now abandoned.

This invention relates to a new and improved method and apparatus for making dense bodies from finely divided material, and is particularly directed to the production of nuclear fuel element components by forming very dense bodies of graphite which are relatively non-porous and mechanically strong. The invention is especially suitable for the formation of graphite fuel compacts having fissile fuel particles dispersed therein.

Heretofore, various methods have been employed in the forming of finely divided or comminuted particles into a compact and integral body, but generally such methods and the apparatus employed have left something to be desired in their efficiency and in the resultant products. Often the resultant product does not have sufficient mechanical strength for its intended purpose, and/or the particles have not been compacted to the desired degree so the resultant product is too porous. Then too, the known methods and apparatus for forming a solid product from comminuted particles frequently involve an operation which takes substantial time and requires cooling the apparatus between each forming operation.

The problems in this respect have been particularly troublesome with respect to the compacting of comminuted refractory materials, such as powdered graphite, which is used in forming of nuclear fuel bodies and/or nuclear fuel elements used in nuclear reactors. In these instances, there is a definite need for a refractory body having very low porosity in order to prevent unwanted diffusible fission products from migrating through the body. Then too, the body must be mechanically strong and dimensionally accurate. The results obtained in this field, prior to the present invention, have not been too satisfactory, particularly with respect to the production of sufficiently dense, non-porous bodies.

The primary object of the present invention is to provide an improved method for forming dense bodies from comminuted particles. A further object is to provide novel apparatus for making dense bodies from particles of refractory material. Still another object is to provide an improved method and apparatus for repeatedly making dimensionally accurate and mechanically strong bodies suitable for use as nuclear fuel element components from powdered graphite, wherein heat and pressure are simultaneously applied to produce a body having a very low permeability with respect to fission products of a neutronic reactor. Other objects and advantages will become apparent from the following description of the selected embodiments of the invention, which is illustrated in the accompanying drawings, wherein:

FIGURE 1 is a schematic view, partly broken away and in section, of one form of apparatus adapted to perform the described method;

FIGURE 2 is a sectional view taken along the line 2—2 of FIGURE 1;

Figure 3:
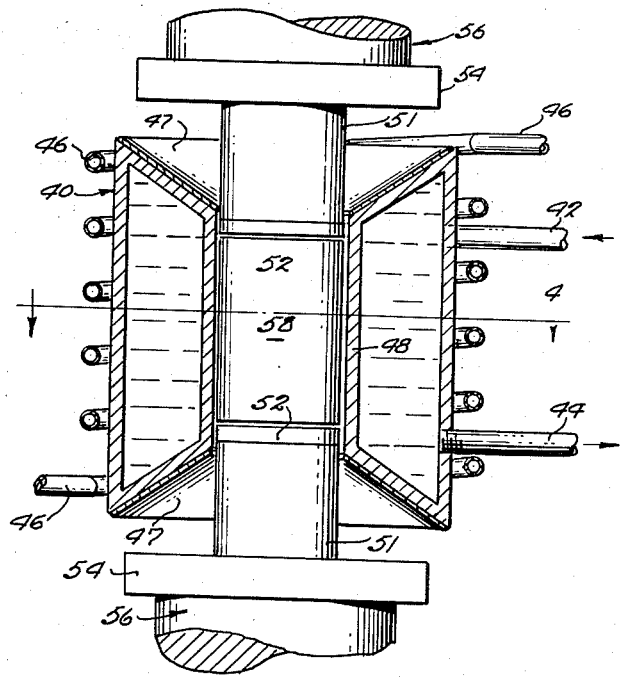
FIGURE 3 is a schematic view, partly broken away and in section, of another embodiment of the invention.

Particular advantages have been gained in connection with the use of the present invention in forming very dense bodies of graphite for use in the production of fuel bodies and components of fuel elements for nuclear reactors. Accordingly, the invention will be described in connection with such a forming operation. However, it will be already appreciated that the principles of this invention may also be used to advantage in connection with other types of bodies and other materials.

Heretofore, the use of graphite to jacket fuel elements has caused considerable difficulty in nuclear reactor construction because diffusible fission products have an undesirable tendency to migrate through graphite. This difficulty is due, of course, to the porosity of the graphite body; and it has been a continuing desire to make graphite bodies which are sufficiently dense to overcome the above difficulty. One way in which graphite bodies for nuclear reactors have been made was by mixing graphite powder with pitch and other binders and then cold pressing the mixture into the desired form. After the pressing, the formed body was baked at an elevated temperature in order to vaporize the volatile materials. In order to achieve optimum density of the final product, it has been necessary to bake the pressed bodies slowly over an extended period of time. If the baking procedure was accelerated, the rate of evolution of gas and volatiles became so great that the resulting body was quite porous.

In accordance with the present invention, the time necessary to produce a graphite body for use as nuclear fuel element component is sharply reduced from that heretofore required. Instead of the several days or weeks formerly required for the prolonged baking, the entire forming operation is reduced to a period of less than one hour, frequently about 10 minutes.

Generally, the invention involves pressing the graphite material in a specially constructed die at a high temperature and pressure. The material in the die is simultaneously subjected to pressure and heat, with the latter being provided by high amperage electrical current.

With reference to FIGURES 1 and 2 of the drawings, it will be seen that one form of apparatus chosen to illustrate the invention comprises generally a hollow thin-walled, cylindrical jacket 10, preferably of metal, being formed with an axial center opening. The jacket 10 includes an inlet duct 12 and an outlet duct 14. The duct 12 having communication with a source of water, or other coolant, and affording flow of coolant through the jacket 10. Internally of the jacket 10, there is an annular die or inner sleeve 16 which is made of a refractory material with low electrical conductivity and high thermal conductivity, such as a suitable carbon. Preferably, the sleeve 16 is formed with one end having a slightly larger inner diameter so that the formed body can be easily removed from this end.

The graphite powder to be formed is first mixed with a suitable bonding material. Carbonaceous compounds, such as pitch, provide suitable binders for graphite. To provide a fuel body, particles of a fissile nuclear fuel, such as uranium carbide, are mixed with the graphite-pitch mixture so that they are dispersed throughout. The particulate mixture is then placed directly in the sleeve 16, and initially compacted therein, as will be hereinafter described.

At opposite ends of the sleeve 16, there are provided plates 18 of non-conductive material and of high strength, such as "Transite." On the inwardly disposed surface of each plate 18, there is provided a bar 20 of electrically conductive material, such as copper, which has fixed thereto a cylindrical plunger member in the form of a conductor rod 22 of graphite, or the like, that is proportioned to slidably fit within the sleeve 16. Each of the bars 20 are suitably connected with a source of high amperage electrical current. The outwardly disposed surface of each of the plates 18 is in engagement with suitable pressure producing means, such as a hydraulic ram, indicated at 24, or the like, that is adapted to move its associated plunger rod 22 inwardly of the die to compress the graphite-pitch mixture into a body 26.

The plunger rods 22 are in contact with the body 26 being formed and provide a path for the conduction of electrical current through the entire body to resistively heat the body 26 uniformly throughout. Furthermore, the disclosed arrangement is designed so that heat is electrically produced throughout the body during the application of the pressure by the hydraulic rams 24. The sleeve 16 provides electrical insulation between the body 26 and the water-cooled metal jacket 10.

The described arrangement also provides a very strong die unit that withstands the high pressures involved during the forming operation. The walls of the tubular jacket 10 are made sufficiently thin to retain only a minor amount of the intense heat produced within the die, and thus, are rapidly cooled after each forming operation. It is also important that the sleeve 16 has reasonably good heat transfer characteristics so that the heat of the formed body 26 is quickly dissipated by the flow of the coolant through the jacket 10 to permit substantially continuous re-use of the die.

Because of the inherent tendency of graphite to oxidize at high temperatures and because of the need for a graphite body to have high strength characteristics, the formed body should not be immediately withdrawn from the sleeve 16 and exposed to the atmosphere. Instead, it is preferable to cool the body 26 to a temperature of at least about 200° C., at which temperature it can be safely removed. Because the body will contract slightly upon cooling, it can be easily removed from the die. By cooling the body 26, while it remains within the sleeve 16, a uniform rate of cooling is attained which is sufficiently slow so that cracking or otherwise undesirable weakening of areas of the body does not occur. However, it is important that the cooling rate be maximized, consistent with these considerations, so that the body may be removed from the die as soon as possible to allow the carrying out of another forming cycle. Applicant's described apparatus affords sufficient flow of coolant to cool at this desired rate. Thus, the cooling is quickly carried out in this apparatus and the process is substantially, continuously repeated.

In the forming process for the graphite bodies, high amperage electrical current is employed to provide sufficient energy to heat the body 26 to a temperature in excess of about 1800° C. but below the sublimation point of the particles and below the temperature at which fissile fuel particles incorporated therein might be adversely affected. The preferred range of temperatures is from about 1800° C. to about 2300° C. when uranium carbide particles are disposed therein. Simultaneously, the hydraulic rams 24 are exerting a high pressure, preferably within the range of about 4000 p.s.i. to about 10,000 p.s.i.

The preferable types of pitch binder which are used with the graphite mixture are either solids or extremely viscous liquids at room temperature. Therefore, to assure that the pitch binder is distributed uniformly throughout the entire body 26, it is preferably to gradually increase the pressure applied to the graphite pitch mixture as it is heated to its ultimate forming temperature. However, in order to provide a suitable path for current through the body 26, the pitch-graphite particle mixture is first compressed without heating. By applying an initial pressure of about 10,000 p.s.i., the particle mixture is compressed to a point where it provides a current path of desirable electrical conductivity. Next, the force applied to the rams 24 is halted, and the current is applied. Then, as the body 26 is heated, the pressure is gradually built-up to final forming pressure.

The simultaneous application of heat and pressure compacts and fuses the graphite particles into a strong and very dense body. The described method produces graphite bodies in a period of minutes which have densities as high as 2.03 g./cm.$^3$.

This method has been extremely useful in forming dense bodies from a mixture of commercial graphite powder and about 10 percent by weight pitch with fissile uranium carbide particles disposed therein. Cylindrical bodies 1 inch in diameter and approximately 3 inches in length have been produced in large quantities by repetition of the forming method.

In one example of the operation, after the mixture had been pre-compressed at 10,000 p.s.i., the conducting rods 22 were supplied with a current of 3000 amps at 20 volts. A pressure was gradually applied to the plungers 22 until 4000 p.s.i. was reached. The described heat and pressure was sustained for a period of 5 minutes, at which time a temperature of 2200° C. was present in the die. Water at a temperature of 15° C. was continuously fed into the inlet of the jacket 10 at a rate of about 5 gallons per minute. About 5 minutes after the current had been discontinued, the temperature of the sleeve and the graphite body had dropped to about 200° C. The graphite body was removed from the die and examined. It was found to have excellent strength characteristics. Upon removal of the body, the die could be immediately re-used. Thus, at these operating conditions, one graphite fuel body could be produced each 12 minutes in a single die.

In another example of the operation, a graphite powder and pitch mixture without any fuel particles dispersed therein was formed into a dense body in accordance with the method of the preceding example. However, a pressure of 5,000 p.s.i. was applied and a temperature of 2500° C. was used. These conditions produced a strong graphite body in a time interval of about 15 minutes. The graphite body was found to have excellent strength characteristics and to have a density of 2.03 g./cm.$^3$.

The very dense bodies produced with this method are of particular use in the production of fuel bodies and/or fuel elements for nuclear reactors. Furthermore, a graphite body produced in this manner is dimensionally accurate because it has been held within a die throughout its complete formation. It is also mechanically stronger and has a lower permeability than graphite bodies made by previously known methods.

Figure 4:
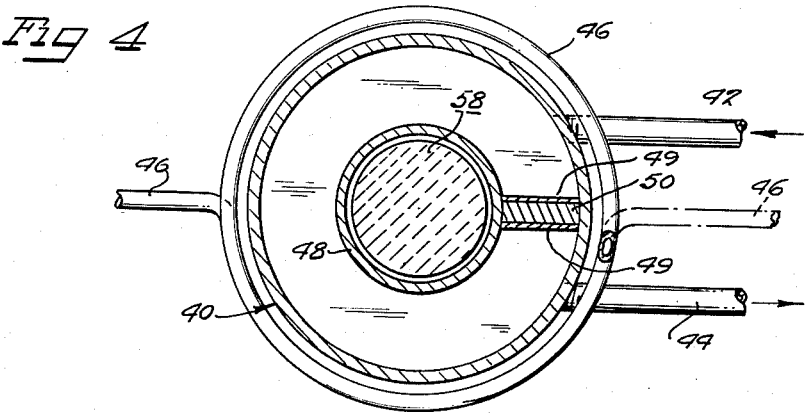
FIGURE 4 is a sectional view taken along line 4—4 in FIGURE 3.

In FIGURES 3 and 4, there is shown another embodiment of apparatus wherein comminuted particles of material can be similarly formed into a very dense body in a short period of time and wherein the forming operation can be repeated without requiring long periods of cooling between each forming operation. In this embodiment, there is provided a hollow-walled cylindrical jacket 40 of a high strength, conductive material, such as a high strength steel. The jacket 40 includes an inlet duct 42 and an outlet duct 44 having communication with a source of water, or other fluid coolant, and affording coolant flow through the jacket 40.

Surrounding the jacket 40, and suitably insulated therefrom, is a generally helically coiled conductor 46, preferably in the form of a hollow copper tube with a liquid coolant flowing internally thereof, which is capable of conducting high amperage electrical currents. The jacket 40 is generally toroidal in shape, the upper and lower surfaces thereof converging toward the center. These surfaces are provided with highly conductive end plates 47, such as copper. As noted particularly in FIGURE 4, the interior of the jacket 40 is provided with a longitudinally extending electrically and thermally insulated gap, which is formed by a material 50 such as alumina, disposed between a pair of dividing wall sections 49. This insulated gap is disposed between the coolant inlet 42 and the outlet 44 to permit circulation of the coolant within the jacket 40. In this respect it is noted that it is desirable to have the coolant inlet 42 and the coolant outlet 44 disposed in adjacent relation on opposite sides of the insulated gap. The central cylindrical cavity formed by the inner wall 48 serves as the forming die. An insulating sleeve (not shown) may be disposed within this cavity to prevent possible sparking. Thus, an electrical current concentrator is provided which guides and concentrates the field produced by the magnetomotive force established by current flowing through the conductor 46 to thereby afford a maximum field within the interior of wall 48 and centrally of the jacket.

At opposite ends of the die, there are disposed a pair of plungers 51, which are of electrically non-conductive material, but which are capped at their free ends with conductive end pieces 52, of graphite or the like. Each of these plungers is fixed to a plate 54 which in turn is connected to a hydraulic ram 56, or the like, that is capable of exerting axial pressure on the plungers 51 inwardly of the die.

The lower plunger 51 is positioned at the bottom of the die and the discrete or comminuted particles are deposited in die cavity in the center of the jacket 40. The upper plunger 51 is brought into position against the top of this loosely compacted body 58 of particles.

High amperage alternating electrical current is passed through the conductor 46 and establishes a high magnetomotive force, the magnetic flux produced by the magnetomotive force is guided and concentrated by the current concentrator contrally of the jacket. The concentrated field in turn induces eddy currents in the body 58. The eddy currents heat the body 58 of particles to a temperature in excess of 2000° C., while the hydraulic rams are operated to exert a pressure of at least 5,000 p.s.i. on opposite ends of the body 58.

It will be noted that the configuration and construction of the water filled jacket 40 is such as to provide a current concentrator capable of producing intense heat within the body 58 in the die. The entire body of particles is heated uniformly to a temperature preferably above 2000° C. at which the particles in the body 58 are fused. The pressure exerted by the plungers 51, preferably at least 5000 p.s.i., coupled with the high temperature compacts the particles and fuses them into a very dense and substantially non-porous body.

Although shown and described with respect to particular material and structure, it will be apparent that other materials and structures may be used to advantage without departing from the principles of this invention.

Various of the features of the invention are set forth in the accompanying claims.

What is claimed is:

1. High pressure and temperature apparatus for forming very dense bodies from particles having relatively high electrical conductivity by simultaneous application of heat and pressure, said apparatus comprising a hollow thin-walled toroidal jacket adapted for fluid communication with a source of coolant, said jacket having an outer side wall and an inner side wall spaced inwardly therefrom, said inner wall being shorter in length than said outer side wall, and being formed with a slot extending between said outer side wall and said inner wall, said jacket also including upper and lower surfaces interconnecting said side walls and converging inwardly towards an axial opening defined by said inner side wall, a pair of high pressure plungers adapted to slidably fit respectively within said axial opening, electrically conductive elements disposed on the facing ends of said plungers, pressure means connected to the outer ends of said plungers and adapted to move each of said plungers axially of said sleeve for the exertion of elevated pressure upon a mass of particles disposed between said plungers within said opening, and electrical means disposed around said jacket and including an electrical conductor connected to an alternating current source which conductor is spirally coiled around said toroidal jacket and insulated therefrom, said coolant source causing sufficient coolant to pass through the jacket to maintain a condition such as to quickly dissipate the heat from said body and allow substantially continuous repetition of the forming procedure.

2. A method for forming a container for nuclear fuel material which method comprises mixing a binder with graphite particles, disposing the mixture in a hollow thin-walled enclosure, initially compressing the mixture and passing an electrical current through the mixture sufficient to assure liquefaction of the binder, then compressing the mixture with a pressure of at least about 4,000 p.s.i. and simultaneously therewith passing a high amperage current directly through the mixture sufficient to produce a temperature of at least about 1800° C. therewithin, discontinuing said heating and said compressing after the mixture is formed into a uniformly strong dense graphite body having a very low permeability to gaseous fission products, continuously circulating sufficient coolant within the walls of said enclosure throughout the forming to rapidly cool said body and said enclosure so that said body can be removed from said enclosure shortly after said heating is discontinued and so that substantially continuous repetition of said forming method can be performed in a single enclosure.

3. A method for forming a nuclear fuel compact which method comprises mixing a binder with graphite particles and particles of nuclear fuel, disposing the mixture in a hollow thin-walled enclosure, initially compressing the mixture and passing an electrical current through the mixture sufficient to assure liquefaction of the binder then compressing the mixture with a pressure of at least about 4,000 p.s.i. and simultaneously therewith passing a high amperage current directly through the mixture sufficient to produce a temperature of at least about 1800° C. therewithin, discontinuing said heating and said compressing after the mixture is formed into a uniformly strong dense fuel compact having a very low permeability to gaseous fission products, continuously circulating sufficient coolant within the walls of said enclosure throughout the forming to rapidly cool said compact and said enclosure so that said compact can be removed from said enclosure shortly after said heating is discontinued and so that substantially continuous repetition of said forming method can be performed in a single enclosure.

References Cited by the Examiner

UNITED STATES PATENTS

| | | | |
|---|---|---|---|
| 2,694,922 | 11/54 | Vilella. | |
| 2,814,849 | 12/57 | Hamilton | 264—60 |
| 2,907,705 | 10/59 | Blainey | 176—91 |
| 2,922,710 | 1/60 | Dombrowski | 264—332 |
| 3,001,237 | 9/61 | Balaguen | 264—27 |
| 3,001,238 | 9/61 | Goeddel et al. | 264—27 |
| 3,031,389 | 4/62 | Goeddel et al. | 176—89 |
| 3,087,877 | 4/63 | Goeddel et al. | 176—89 |
| 3,097,151 | 7/63 | Martin | 176—89 |

OTHER REFERENCES

The Review of Scientific Instruments, pages 267–269 and 271–272 relied upon. April 1958, vol. 29, No. 4. 18-Hi. Pres. Dig.

Science, "Ultrahigh-Pressure Research," pages 445–449 relied upon, August 29, 1958, vol. 128, No. 3322. 18-Hi-Pressure Dig.

CARL D. QUARFORTH, *Primary Examiner.*

ALEXANDER H. BRODMERKEL, *Examiner.*